(No Model.) 4 Sheets—Sheet 1.
E. W. RICE, Jr.
REGULATOR FOR ELECTRIC GENERATORS.
No. 467,358. Patented Jan. 19, 1892.
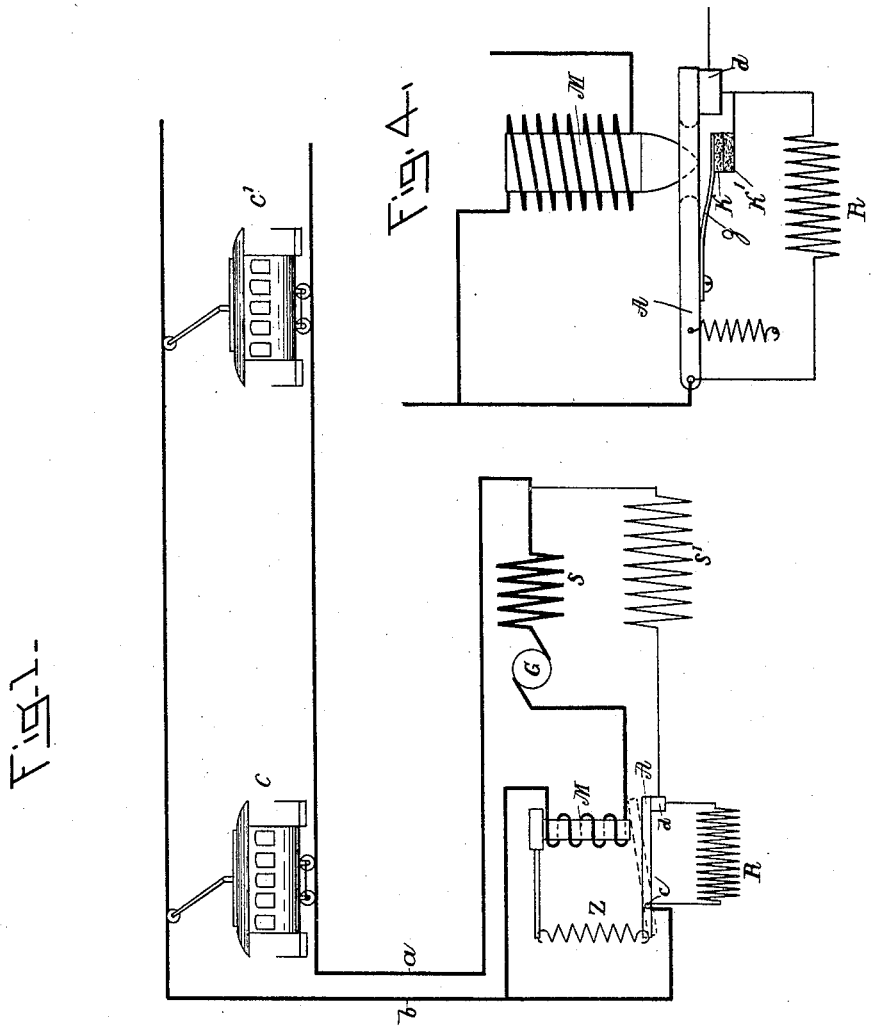
WITNESSES.
INVENTOR.

(No Model.)  4 Sheets—Sheet 2.
E. W. RICE, Jr.
REGULATOR FOR ELECTRIC GENERATORS.
No. 467,358.  Patented Jan. 19, 1892.
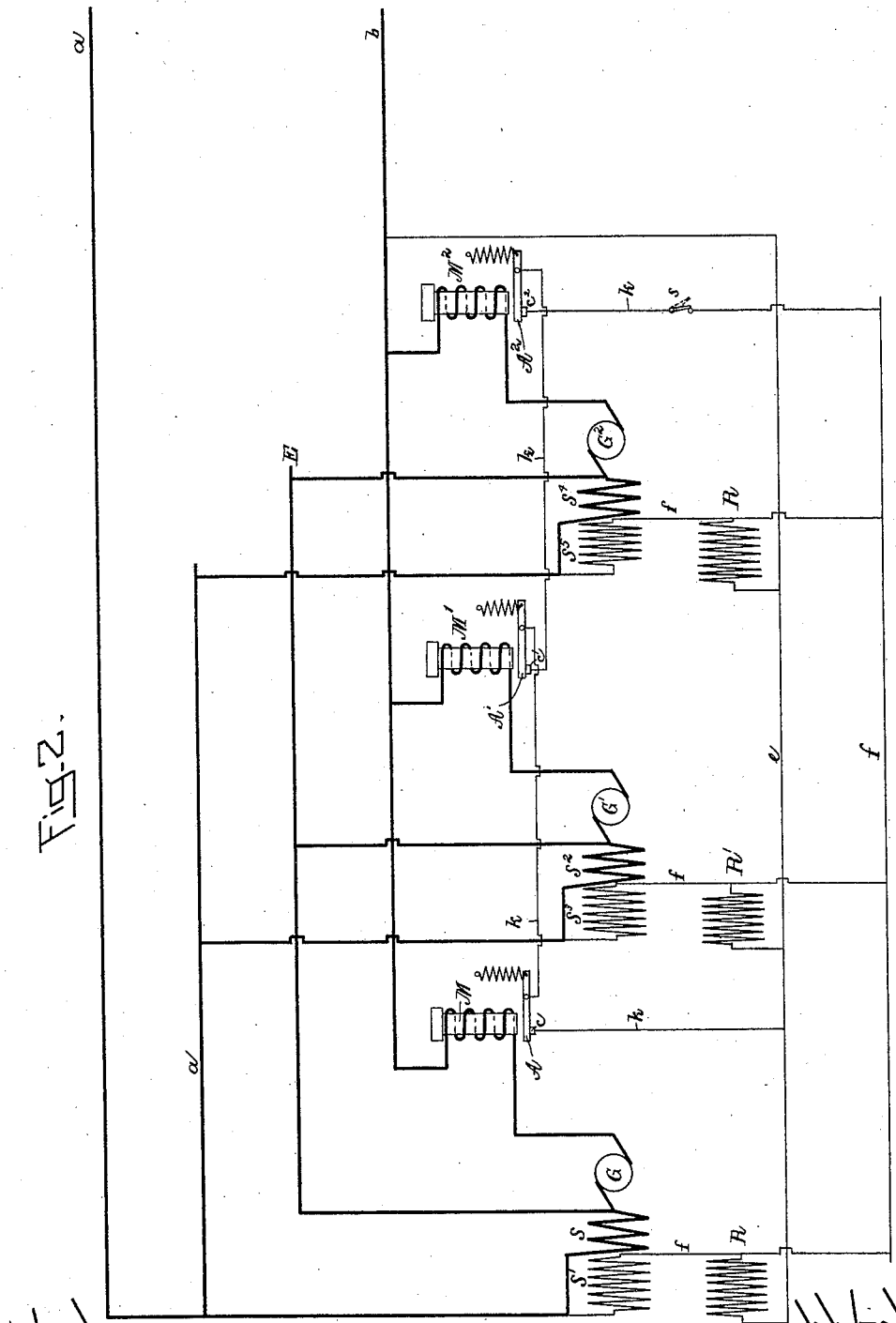
Witnesses
Inventor
Edwin W. Rice Jr.

(No Model.)　　　　　　　　　　　　　　4 Sheets—Sheet 3.
E. W. RICE, Jr.
REGULATOR FOR ELECTRIC GENERATORS.
No. 467,358.　　　　　　　　　Patented Jan. 19, 1892.
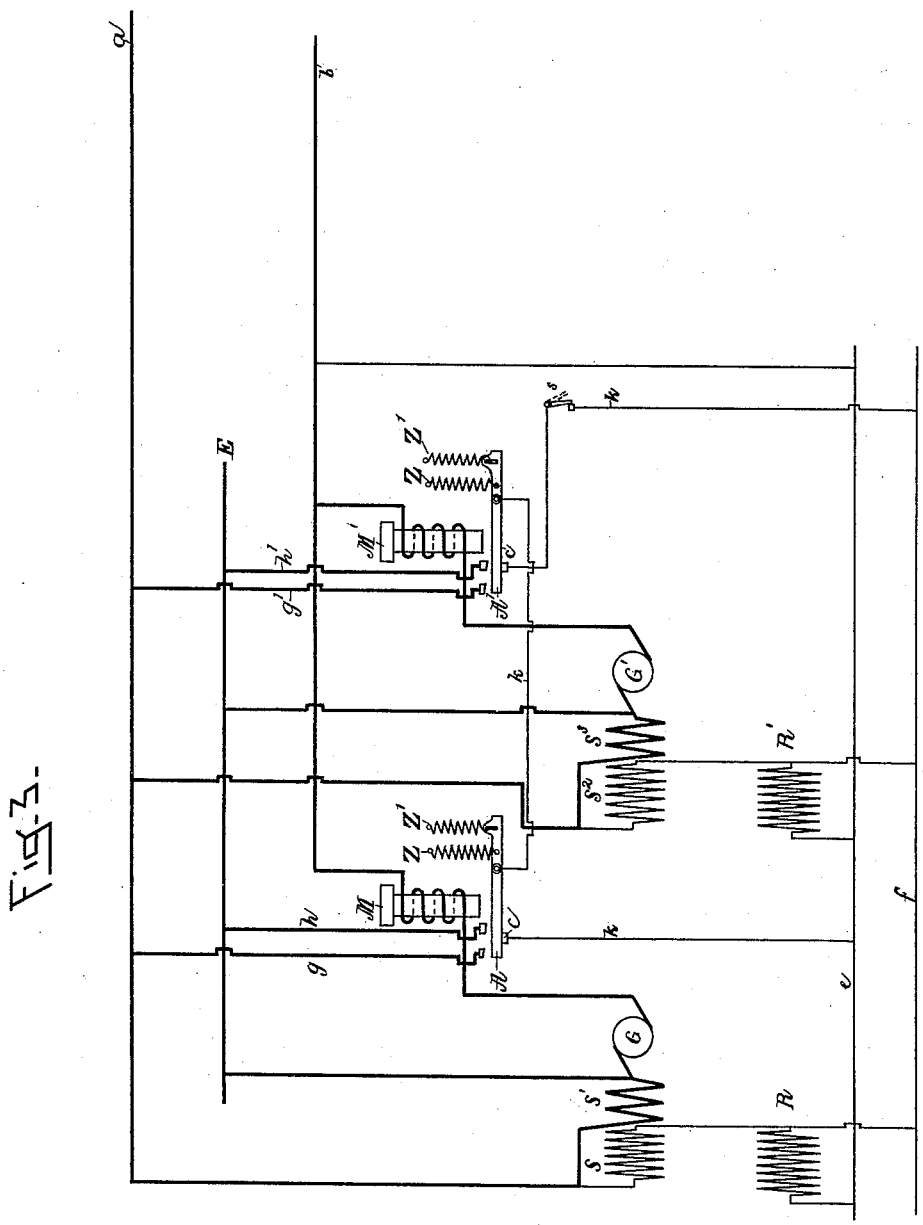
Witnesses　　　　　　　　　　　Inventor.

(No Model.) 4 Sheets—Sheet 4.
E. W. RICE, Jr.
REGULATOR FOR ELECTRIC GENERATORS.
No. 467,358. Patented Jan. 19, 1892.
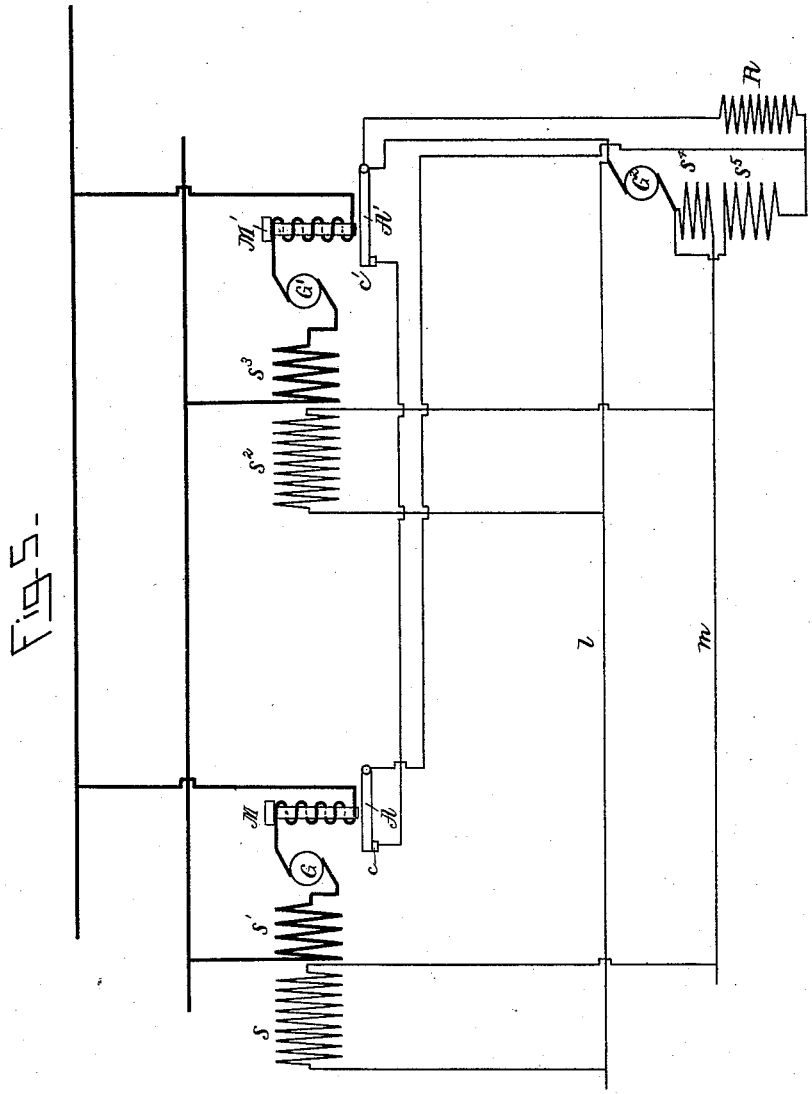

UNITED STATES PATENT OFFICE.

EDWIN WILBUR RICE, JR., OF LYNN, MASSACHUSETTS, ASSIGNOR TO THE THOMSON-HOUSTON ELECTRIC COMPANY, OF CONNECTICUT.

REGULATOR FOR ELECTRIC GENERATORS.

SPECIFICATION forming part of Letters Patent No. 467,358, dated January 19, 1892.

Application filed May 2, 1890. Serial No. 350,283. (No model.)

*To all whom it may concern:*

Be it known that I, EDWIN WILBUR RICE, Jr., a citizen of the United States, residing at Lynn, in the county of Essex, of the State of Massachusetts, have invented certain new and useful Improvements in Regulators for Electric Generators, of which the following is a specification.

My present invention relates to a system of electric distribution in which currents of constant potential are generated at a station and led by suitable conductors to the work situated at greater or less distances from the power-station.

My invention is a novel regulating apparatus to be used with systems of electric-power distribution, the object of which is to protect the generator or generators from injury by the development of abnormal currents, or to establish such conditions that upon an excessive demand for current being made upon such generator or generators the potential will upon overload or short-circuit be automatically diminished and the devices upon the external circuit operated at a lowered potential, instead of being disconnected altogether, as has been the case hitherto when fuses or devices for interrupting the main circuit have been employed. Thus in a system of electric-power distribution in which the generators are controlled by my present regulating apparatus the current capacity of the power-station at the normal potential is limited and definite, the potential remaining constant only so long as the load or work does not exceed that amount which has been selected as the maximum for the ordinary conditions under which the system is to be run, and the potential automatically falling off or decreasing when extraordinary demands exist which might involve danger to the apparatus.

My invention is not limited to any particular arrangement of the external circuits, as it is applicable to a railway system in which a bare overhead conductor is used, with the track as a return-circuit, a double overhead trolley system, or, in fact, any system in which currents of constant potential are employed and in which great variations in the demand for current exists. It is particularly applicable to systems of distribution employing electric motors for the propulsion of street-cars, as in such systems the maximum speed of the electric motors driving the cars with a certain load is directly dependent upon the potential or pressure of the supply-mains, the current which is required to drive the cars at a low speed with a reduced potential on the supply-mains being approximately the same as is required to drive the same cars at the high speed with the high initial potential of the supply-mains. It follows that the energy supplied by the generators to the line, and therefore the demand upon the prime motors at the station, will be, with a given system and a given number of cars on the line, approximately directly proportional to the potential at which the current is supplied. It has been the custom hitherto in case the line was greatly overloaded to interrupt the feeders or mains supplying the district in which the overload was located, thereby absolutely stopping the traffic in that section. This, it can readily be seen, is a great inconvenience and is very objectionable. By my invention, in case of an overload the potential supplied to the overloaded district is automatically lowered, so that the power or energy required from the station is not increased abnormally and the traffic does not altogether cease, but the cars run at a lower speed and continue at that speed until the overload is relieved by cutting in additional generators at the station, or until some of the cars upon that section are removed or the overload relieved in any manner.

I have illustrated my invention diagrammatically in the accompanying drawings, in which—

Figure 1 shows my invention as applied to a compound dynamo used for furnishing current to an electric-railway system. Fig. 2 is an extension of the application of my invention to a set of generators acting conjointly or in multiple to furnish currents to a set of constant-potential mains used for power or lighting purposes, &c. Fig. 3 is a modification in which the short-circuiting action of the series windings is accomplished through the agency of the regulating apparatus of my invention, such short-circuiting action acting, preferably, in conjunction with the interposition of the resistance in the shunt field-circuit of the generator in the manner mentioned. Fig. 4 shows a preferred form of magnet and contact to be used in connection with my present invention. Fig. 5 illustrates another modification.

In Fig. 1, S S' represent, respectively, the series and shunt winding of a compound-wound dynamo used to supply current to the electric main $a\ b$ of an overhead electric-railway system—that is, a system in which a single overhead wire is used to convey currents to the traveling vehicles C C', the return of the current being accomplished through the track or other conductor. The current from the armature of the generator G passes through the magnet M, and then out the line $a\ b$. The shunt-coil S' is connected, as usual, around the brushes of the generator G, or between the mains $a\ b$. In series with the shunt-coil S' is placed a resistance R, which is normally shunted by the armature A of the magnet M, which armature in its unattracted position establishes connection between the points $c\ d$, which are the terminals of the resistance R, as shown. The spring Z counteracts the attractive force of the magnet M upon its armature A, and this spring may be made adjustable in strength according to the conditions present.

The operation is as follows: The spring Z having been previously properly adjusted, the two windings S S' of the generator G act conjointly to energize the field-magnets, and the strength of magnetization is increased or diminished, as usual, in accordance with the varying demands for current by the devices connected between the mains $a\ b$. When this demand has increased, however, to an extent which would, if satisfied, be apt to injure the generating apparatus, the attractive force of the magnet M overcomes the spring Z and attracts the armature A to the position indicated by the dotted lines. In this position of the armature A the short-circuiting of the resistance R is interrupted or broken, and the current in the shunt-winding S' has now to traverse the additional resistance R thus interposed. The magnetic field of the generator G becomes weaker, and the potential of the current supplied to the mains $a\ b$ is thus automatically decreased by any predetermined amount. The armatures of the motors on the vehicles C C' having now less counter electro-motive force to produce, will lower their speed of revolution, while the demand for current may remain approximately the same, and thus the whole system is automatically slowed down until the demand for current between the mains $a\ b$ has diminished to that amount which has been selected as the maximum at the normal potential which the generators can furnish with safety when the armature returns to its normal position of shunting the resistance R.

In Fig. 2 three compound-wound generators G G' G² are shown with my regulating apparatus applied. Here the main current from each of the generators G G' G² traverses the magnets M M' M², respectively, before it reaches the main $b$. The shunt-windings S' S³ S⁵ are connected, one terminal of each winding to the main $a$, and the other terminal of each winding to the main $b$ or to points corresponding in potential to that between these mains. This connection in the figure being shown as accomplished in multiple through the line $f$. The line $k$ is kept closed only when each of the armatures A A' A² is in its unattracted position, as the contact-points $c\ c'\ c^2$ are all arranged in series with each other. The resistances R are also arranged in multiple, one terminal of each resistance being connected to the line $f$ and the other end of each of the resistances to the line $e$, which forms a common connection to the main $b$. It will be seen that by this arrangement each and all of the resistances R are shunted or short-circuited by the line $k$ when the contacts $c\ c'\ c^2$ are closed; but when an excessive current is demanded of any one of the generators G G' G², the corresponding magnet M M' M² included in their respective generator-circuits interrupts the line $k$, and consequently the short-circuiting of the resistances R R' R², which resistances are now placed in series with the shunt-windings S S³ S⁵. In this way each machine is dependent upon the others connected in multiple with it and the maximum current-output at normal potential of any one machine can never exceed that which has been selected as its capacity to insure safety to the apparatus. As in the case of Fig. 1, when the demand for current has reached the amount which the generators can furnish with safety the armatures A A' A² assume their normal or closed position for closing the line $k$ and shunting the resistances R R' R². $s$ is a switch controlling the circuit $f$ for closing and opening the same, when desired. I have shown in connection with this figure an equalizing-cable E, connecting the series windings of the generators in accordance with my Patent No. 328,253.

The modification shown in Fig. 3 may sometimes be employed. In this arrangement the resistances R R' are controlled to regulate the output of the generators G G' by the armatures A A' in the circuit $k$ in the same manner as in Fig. 2; but I employ in addition thereto a short-circuiting arrangement for the series-windings of the generators G G'. $g\ h$ and $g'\ h'$ indicate heavy conducting-lines connected around the series windings S' S³ of the generators, as shown, the terminals being brought to a position where a movement of the armatures A A' can establish a connection between them, thus short-circuiting the series windings S' S³. This short-circuiting is auxiliary to the interposition of the resistance R R' and is preferably not accomplished simultaneously with the introduction of such resistance; but in case of an excessive overload existing at the reduced potential established when the resistance R is included in the circuit this short-circuiting of the series coils may be relied upon to save the apparatus from danger when the resistance between the mains $a$ $b$ from any cause—as from a short circuit—is so low that abnormal and dangerous heating-currents could be generated at the lowered potential. In this case, also, the apparatus resumes its normal condition as soon as the current has resumed its normal amount. To secure the successive actions of introducing the resistances R R' and the short-circuiting of the coils S' S³, I employ two springs Z Z' in connection with the armatures A A', the spring Z acting alone at first against the attractive force of the magnet M, and the connection of the spring Z' to the armature-lever having a small amount of lost motion, so that both springs Z Z' must be overcome to close contact between the terminals $g$ $h$.

In Fig. 4 I have illustrated at M the best form of magnet to be used in opening the shunt-field contacts $c$ $d$. It is of the form known as the "paraboloidal pole-magnet," and the purpose in selecting such a magnet is to obtain a uniform attraction of the armature throughout an extended range of movement with the same current flowing. K K' indicate auxiliary contacts to that at $d$. The contact K K' is preferably made of some arc-resisting material, as carbon, which will stand frequent operation of the circuit-opening armature A. The contacts K K' are held together by a spring Z, which maintains contact after the separation at the point $d$ is effected. This arrangement is used to insure the integrity of the electrical contact at $d$ in shunting the resistance R.

In Fig. 5, which illustrates the preferred mode of operating my invention, the letters of reference corresponding to those in the previously-described figures refer to similar parts. In this figure I have shown my invention applied to generators having their field-magnets separately excited. G² shows the exciting-dynamo and the shunt-coils S S² of the generators G G' are connected in multiple between the mains $l$ $m$, leading from the brushes of the exciter. The exciter G² is also preferably compound-wound, having direct and shunt coils S⁴ S⁵, respectively.

The operation with the connections shown is as follows: The armatures A A' in their normal condition or closed position shunt the resistance now arranged to be included in the shunt-field-magnet circuit of the exciter instead of, as in the previously-described arrangements, in the shunt-fields of the main generators, and upon an overload of either of the generators G G' the armatures A or A' is attracted to break contact at $c$ $c'$ and throw the resistance R in series with the shunt-field-magnet coils S⁵ of the exciter G², thereby decreasing the exciting current to each of the generators G G' and lowering their potential to any predetermined point, as, say, from a normal pressure of five hundred volts to three hundred volts. The short-circuiting arrangements for the series coils, as described in Fig. 3, could of course be used in connection with the apparatus of Fig. 5, if desired.

What I claim as new, and desire to secure by Letters Patent, is—

1. The combination, with a dynamo-electric machine, of an electro-motive-force regulator therefor and a controller for said regulator depending upon the output of the machine and set to act only at the point of maximum output.

2. The combination, with a dynamo-electric machine, of a regulator for its field-magnet and a controlling device for the said regulator adjusted to act only at the point of maximum output and adapted to reduce the field-magnet strength when the point of maximum output has been reached.

3. The combination, with a dynamo-electric machine, of a derived-circuit field-magnet, a resistance in series with said field-magnet, and a short-circuiting device for said resistance controlled by an electric magnet set to respond only at the point of maximum output, whereby when the said point of maximum output has been reached the magnet acts to cut in the said resistance and thereby decrease the field-magnet strength and the electro-motive force of the generator.

4. The combination, with an electric circuit, of two or more generators connected thereto, a regulator for each of said generators, and a controlling device adjusted to act only at the point of maximum output on the main line and adapted to reduce the electro-motive force of all of the generators when said point of maximum output has been reached.

5. The combination, with two or more electric generators connected to a circuit in multiple arc, of means for regulating the electro-motive force thereof and a controlling device in the circuit of each generator adjusted to act only at the point of maximum current, each of said controlling devices connected with the regulating means and adapted to control both of said generators.

6. The combination, with a compound generator connected to a circuit, of a regulator adjusted to act only at the point of maximum current to reduce the strength of both the shunt and series-coil field-magnet.

7. The combination, with an electric circuit, of two or more generators connected thereto in multiple arc, a regulator for each of said generators, a magnet in the main line of each generator, and a controlling-circuit for said regulator having circuit-breakers in series controlled, respectively, by the said magnets.

8. The combination, with an electric circuit, of a generator connected thereto and automatically regulated to maintain a constant potential on the said circuit and a supplementary regulator adjusted to act only at the point of maximum current and reduce the electro-motive force of the generator.

9. The combination, with an electric circuit, of two or more generators connected therewith and automatically regulated to co-operate in maintaining a constant potential upon the said circuit and a supplementary regulator adapted to act only at the point of maximum current of the said circuit and reduce the electro-motive force of each of the said generators.

EDWIN WILBUR RICE, JR.

Witnesses:
JOHN W. GIBBONEY,
GEO. R. BLODGETT,